United States Patent
Lin et al.

(10) Patent No.: US 10,824,836 B2
(45) Date of Patent: Nov. 3, 2020

(54) FINGERPRINT SENSING MODULE

(71) Applicants: Egis Technology Inc., Taipei (TW); Igistec Co., Ltd., Hsinchu County (TW)

(72) Inventors: Yu-Hsuan Lin, Hsinchu County (TW); Tang-Hung Po, Hsinchu County (TW); Hsien-Hsiang Chiu, Hsinchu County (TW); Chung-Yi Wang, Hsinchu County (TW)

(73) Assignees: EGIS TECHNOLOGY INC., Taipei (TW); IGISTEC CO., LTD., Hsinchu County (TW)

( * ) Notice: Subject to any disclaimer, the term of this patent is extended or adjusted under 35 U.S.C. 154(b) by 0 days.

(21) Appl. No.: 16/526,418

(22) Filed: Jul. 30, 2019

(65) Prior Publication Data

US 2020/0134277 A1    Apr. 30, 2020

Related U.S. Application Data

(60) Provisional application No. 62/751,707, filed on Oct. 29, 2018.

(30) Foreign Application Priority Data

Jun. 25, 2019    (CN) .......................... 2019 1 0556783

(51) Int. Cl.
   *G06K 9/00*    (2006.01)
   *G06F 3/041*   (2006.01)
   *G06F 3/044*   (2006.01)

(52) U.S. Cl.
   CPC ......... *G06K 9/0002* (2013.01); *G06F 3/0416* (2013.01); *G06K 9/0004* (2013.01); *G06F 3/044* (2013.01); *G06K 9/00087* (2013.01)

(58) Field of Classification Search
   CPC .............. G06K 9/0002; G06K 9/0004; G06K 9/00006; G06K 9/00087; G06K 9/00013; G06F 3/041; G06F 3/0416; G06F 3/044
   See application file for complete search history.

(56) References Cited

U.S. PATENT DOCUMENTS 6,234,031 B1 *   5/2001   Suga .................... G06K 9/0002
                                                 73/862.474

* cited by examiner

*Primary Examiner* — Koosha Sharifi-Tafreshi
(74) *Attorney, Agent, or Firm* — WPAT, PC

(57) ABSTRACT

A fingerprint sensing module includes a fingerprint sensing pixel array, a plurality of column circuitries and a constant current circuit. The fingerprint sensing pixel array includes a plurality of sensing pixels in an array arrangement. Each column circuitry is electrically coupled to a row of the sensing pixels via a corresponding row signal line. The constant current circuit generates a bias voltage to the column circuitries according to a reference current. In response to the bias voltage level, a row output current provided by each column circuitry and flowing through each row of the sensing pixels is equal to or close to the reference current. Since the row output current coincides with the reference current, the row output current is not adversely affected by the external factors.

11 Claims, 3 Drawing Sheets

FINGERPRINT SENSING MODULE

CROSS-REFERENCE TO RELATED APPLICATION

This application claims priority to U.S. Provisional Patent Application No. 62/751,707 filed Oct. 29, 2018 and Chinese Patent Application No. 201910556783.4 file Jun. 25, 2019, the contents of which are incorporated herein by reference.

FIELD OF THE INVENTION

The present invention relates to a fingerprint sensing module, and more particularly to a fingerprint sensing module with a constant current.

BACKGROUND OF THE INVENTION

With the maturity of the modern fingerprint sensing technology, fingerprint sensing modules have been widely used in various electronic devices. For example, under-display fingerprint sensing modules have been applied to smart mobile devices such as digital cameras, scanners, smart phones, tablet computers or notebook computers. Generally, the fingerprint sensing module works with a voltage circuit to implement the fingerprint sensing operation. FIG. 1 is a schematic circuit diagram illustrating a conventional fingerprint sensing module with an external constant voltage circuit.

As shown in FIG. 1, the conventional fingerprint sensing module 10 includes a fingerprint sensing pixel array 110, a plurality of column circuitries 121~12n, an external constant voltage circuit 130 and a control circuit 140. The fingerprint sensing pixel array 110 includes a plurality of sensing pixels, which are arranged into a plurality of columns 111~11n. The plurality of sensing pixels in the plurality of columns 111~11n (hereinafter referred as pixel columns) are electrically coupled to the corresponding column circuitries 121~12n through corresponding column signal lines $L_{11}$~$L_{1n}$. For example, the column circuitries 121~12n are implemented by transistors. In response to a constant voltage $V_1$ provided by the external constant voltage circuit 130, the column circuitries 121~12n are configured to drive the corresponding pixel columns 111~11n to generate corresponding column output currents $I_{11}$~$I_{1n}$. The control circuit 140 is configured to generate control signal $C_1$ (e.g., the control signals $C_{11}$~$C_{1n}$) and force the fingerprint sensing pixel array 110 to sense the fingerprint or read the sensed contents.

However, the conventional structure aforementioned may have some issue caused by the mismatches between the constant voltage $V_1$ of the external constant voltage circuit 130 and the characteristics of the transistors of the column circuitries 121~12n.

For example, in case that the single constant voltage $V_1$ is designed and provided to the column circuitries 121~12n and applied to different display panels, the column output currents $I_{11}$~$I_{1n}$ will be different due to the mismatches between the transistors of the column circuitries 121~12n. For overcoming this drawback, an additional calibration mechanism is needed to adjust the column output currents $I_{11}$~$I_{1n}$ for the pixel columns 111~11n.

Moreover, because of the temperature characteristics of the current of the transistor, even if the voltages applied to the gate terminals of the column circuitries 121~12n are identical, the drain currents of the column circuitries 121~12n at different temperatures are possibly different. Consequently, the column output currents $I_{11}$~$I_{1n}$ flowing through the pixel columns 111~11n are not stable. Moreover, the conventional structure with external constant voltage circuit 130 still has other problems. While the signals corresponding to the sensed contents are transferred through the flexible circuit board, the signals are readily interfered by the circuitry noise due to long distance transmission. Under this circumstance, the accuracy of the contents sensed by the fingerprint sensing module 10 is impaired.

For overcoming the drawbacks of the conventional technologies, the present invention provides a novel fingerprint sensing module for effectively providing the stable output currents to the fingerprint sensing pixel array so as to increase the overall sensing quality.

SUMMARY OF THE INVENTION

For solving the drawbacks of the conventional technologies, the present invention provides a fingerprint sensing module for providing stable output currents. The fingerprint sensing module is equipped with a constant current circuit for providing the stable output currents to the fingerprint sensing pixel array. Consequently, the sensed contents of each sensing pixel can be outputted from each pixel column and/or each row of sensing pixels more accurately.

In accordance with an aspect of the present invention, a fingerprint sensing module is provided. The fingerprint sensing module includes a fingerprint sensing pixel array, a plurality of column circuitries and a constant current circuit. The fingerprint sensing pixel array is used for sensing a fingerprint signal. The fingerprint sensing pixel array includes a plurality of sensing pixels in an array arrangement. Each column circuitry is electrically coupled to a row of the sensing pixels via a corresponding row signal line. The constant current circuit generates a bias voltage to the column circuitries according to a reference current. In response to the bias voltage, a row output current provided by each column circuitry and flowing through each row of the sensing pixels is equal to or close to the reference current.

In accordance with another aspect of the present invention, a fingerprint sensing module is provided. The fingerprint sensing module includes a fingerprint sensing pixel array, a plurality of column circuitries, a current circuit and a biasing circuit. The fingerprint sensing pixel array is used for sensing a fingerprint signal. The fingerprint sensing pixel array includes a plurality of sensing pixels in an array arrangement. Each column circuitry is electrically coupled to a column of the sensing pixels via a corresponding column signal line. The current source provides a reference current. A first terminal of the biasing circuit is electrically coupled to the current source to receive the reference current. A second terminal of the biasing circuit is electrically coupled to a baseline voltage. A third terminal of the biasing circuit is electrically coupled to the column circuitries. The bias voltage is generated on the third terminal of the biasing circuit in response to the reference current. In response to the bias voltage, a row output current is provided by each column circuitry, and the row output current is equal to or close to the reference current.

From the above descriptions, the fingerprint sensing module of the present invention is equipped with the constant current circuit. Consequently, each of the column output currents or the row output currents provided by the column circuitries is equal to the reference current, and the column output current or the row output current is not adversely affected by the external factors. The fingerprint sensing module is equipped with the constant current circuit for providing the stable output currents to the fingerprint sensing pixel array. Consequently, the sensed contents of each sensing pixel can be outputted from each pixel column and/or each row of sensing pixels more accurately.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

The embodiments of present invention will be described more specifically with reference to the following drawings. In the following embodiments and drawings, the elements irrelevant to the concepts of the present invention or the elements well known to those skilled in the art are omitted. It is noted that numerous modifications and alterations may be made while retaining the teachings of the invention.

Figure 1:
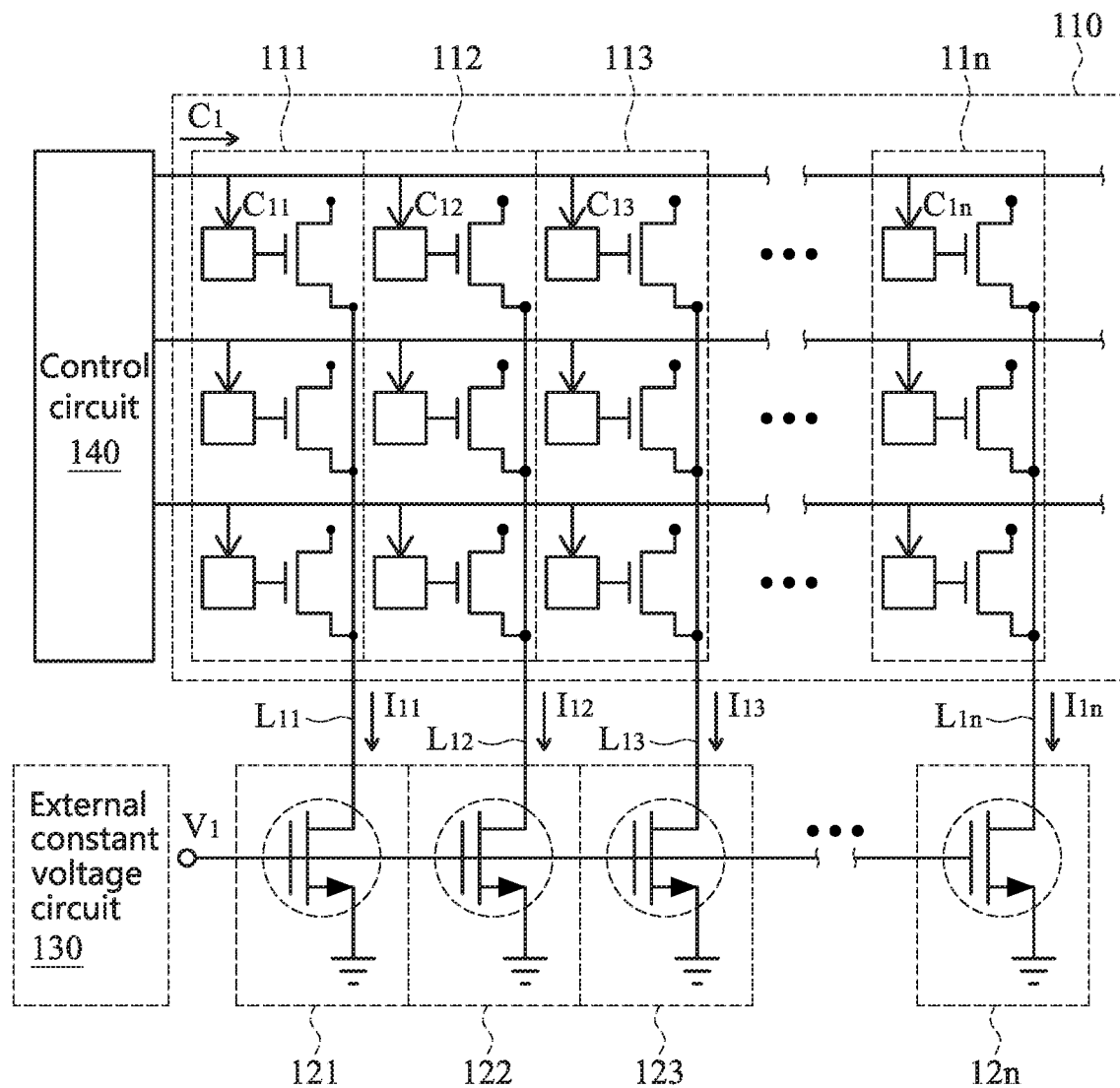
FIG. 1 is a schematic circuit diagram illustrating a conventional fingerprint sensing module for an external constant voltage circuit.
Figure 2:
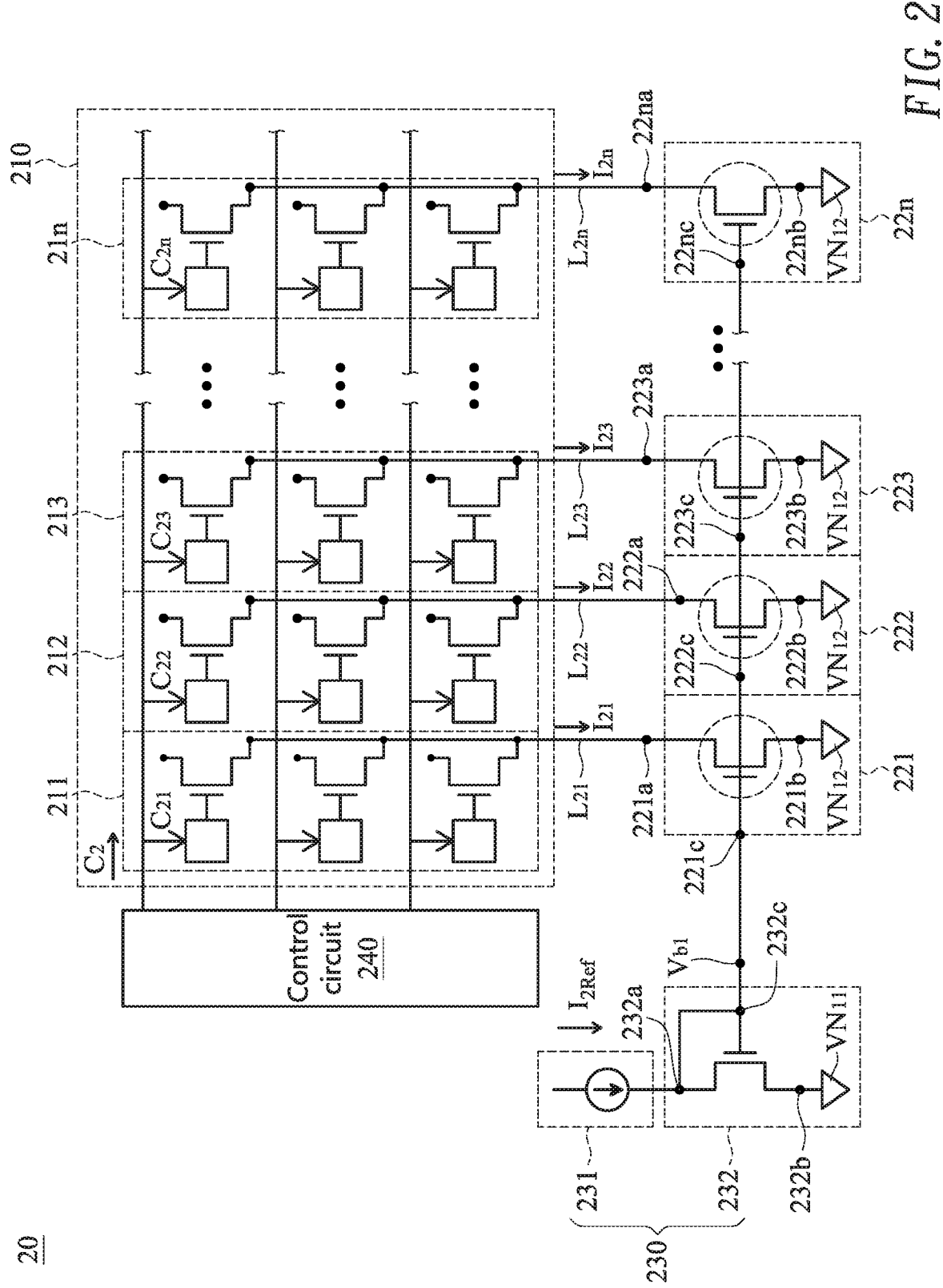
FIG. 2 is a schematic circuit diagram illustrating a fingerprint sensing module using a common current source according to an embodiment of the present invention.

FIG. 2 is a schematic circuit diagram illustrating a fingerprint sensing module using a common current source according to an embodiment of the present invention. As shown in FIG. 2, the fingerprint sensing module 20 includes a fingerprint sensing pixel array 210, a plurality of column circuitries 221~22n, a plurality of column signal lines $L_{21}$~$L_{2n}$, a constant current circuit 230 and a control circuit 240. The fingerprint sensing pixel array 210 includes a plurality of sensing pixels, which are arranged into a plurality of columns 211~21n. Hereinafter, the plurality of sensing pixels in the plurality of columns 211~21n are referred as pixel columns. Each of the pixel columns 211~21n includes a plurality of sensing pixels (the numeral references are not shown), which are electrically coupled to each other. Each output node of each sensing pixel is electrically coupled to the corresponding column circuitries 221~22n through the column signal lines $L_{21}$~$L_{2n}$. The control circuit 240 is configured to generate control signal $C_2$ (e.g., the control signals $C_{21}$~$C_{2n}$) to control the fingerprint sensing pixel array 210 to sense the fingerprint or read the sensed contents.

In an embodiment, the constant current circuit 230 includes a current source 231 and a biasing circuit 232. A first terminal 232a of the biasing circuit 232 is electrically coupled to the current source 231 and a third terminal 232c of the biasing circuit 232. A second terminal 232b is electrically coupled to a first baseline voltage $VN_{11}$. The biasing circuit 232 receives a reference current $I_{2Ref}$ from the current source 231 and generates a bias voltage $V_{b1}$. In an embodiment, the biasing circuit 232 includes a bias transistor. The first terminal 232a of the biasing circuit 232 is a drain terminal of the bias transistor. A second terminal 232b of the biasing circuit 232 is a source terminal of the bias transistor. The third terminal 232c of the biasing circuit 232 is a gate terminal of the bias transistor.

The first terminals 221a~22na of the column circuitries 221~22n are electrically coupled to the corresponding pixel columns 211~21n. The second terminals 221b~22nb of the column circuitries 221~22n are electrically coupled to a second baseline voltage $VN_{12}$. The third terminals 221c~22nc of the column circuitries 221~22n are electrically coupled to the third terminal 232c of the biasing circuit 232 and receive the bias voltage $V_{b1}$ from the bias circuit 232. Consequently, the pixel columns 211~21n electrically coupled to the first terminals 221a~22na of the column circuitries 221~22n generate corresponding column output currents $I_{21}$~$I_{2n}$. In this embodiment, each of the column circuitries 221~22n includes a transistor. The first terminals 221a~22na of the column circuitries 221~22n are the drain terminals of the transistors. The second terminals 221b~22nb of the column circuitries 221~22n are the source terminals of the transistors. The third terminals 221c~22nc of the column circuitries 221~22n are the gate terminals of the transistors. The level of the first baseline voltage $VN_{11}$ is equal to or lower than the level of the second baseline voltage $VN_{12}$.

Please refer to FIG. 2 again. A current mirror circuit is defined by the current source 231, the biasing circuit 232 and the column circuitries 221~22n collaboratively. Consequently, the column output current $I_{21}$ flowing through the pixel column 211 is equal to or close to the reference current $I_{2Ref}$. That is, due to the mirror copying property of the current mirror circuit, the column output current $I_{21}$ flowing through the pixel column 211 coincides with the reference current $I_{2Ref}$, and the column output current $I_{21}$ and the reference current $I_{2Ref}$ are equal. In other words, the column output current $I_{21}$ is not adversely affected by the external factors (e.g., the ambient temperature and the power voltage level $V_{DD}$ of the pixel column 211).

Due to the mirror copying property of the current mirror circuit, each of the column output currents $I_{21}$~$I_{2n}$ flowing through the pixel columns 211~21n of the fingerprint sensing pixel array 210 is equal to the reference current $I_{2Ref}$. Consequently, the problems caused by the mismatch issue between the transistors will be overcome. As mentioned above, each of the column output currents $I_{21}$~$I_{2n}$ is equal to the reference current $I_{2Ref}$ because of the mirror copying property of the current mirror circuit. Thus the output stage transistors electrically coupled to the pixel columns 211~21n can be normally operated.

It is noted that numerous modifications and alterations may be made while retaining the teachings of the invention. That is, the structural designs and specifications of the components may be varied according to the practical requirements. For example, the constant current circuit is a differential amplifier or a current mirror circuit that provides the bias voltage to the transistor of each column circuitry. The current mirror circuit has the above basic current mirror configuration. Alternatively, according to the practical requirements, the current mirror circuit has a cascode current mirror configuration, a Wilson current mirror configuration or a Widlar current mirror configuration.

Figure 3:
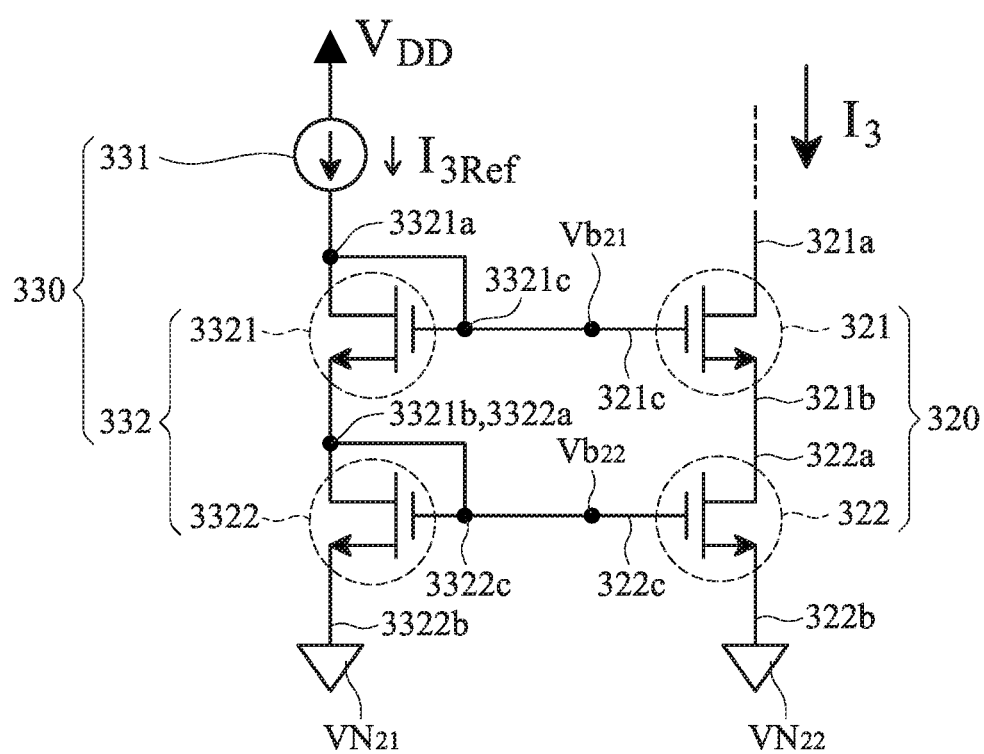
FIG. 3 is a schematic circuit diagram illustrating the constant current circuit and a portion of the column circuitry of the fingerprint sensing module according to another embodiment of the present invention.

FIG. 3 is a schematic circuit diagram illustrating the constant current circuit and a portion of the column circuitry of the fingerprint sensing module according to another embodiment of the present invention. In comparison with FIG. 2, the implementation examples of the constant current circuit 330 and a portion of the column circuitry 320 are shown. Firstly, the example of the constant current circuit 330 will be described as follows. The constant current circuit 330 includes a current source 331 and a biasing circuit 332. The biasing circuit 332 includes a first bias transistor 3321 and a second bias transistor 3322. The current source 331 is electrically coupled to a first terminal 3321a and a third terminal 3321c of the first bias transistor 3321. The current source 331 provides a reference current $I_{3Ref}$. A second terminal 3321b of the first bias transistor 3321 is electrically coupled to a first terminal 3322a and a third terminal 3322c of the second bias transistor 3322. A second terminal 3322b of the second bias transistor 3322 is electrically coupled to a first baseline voltage $VN_{21}$. Since the reference current $I_{3Ref}$ flows through the first bias transistor 3321 and the second bias transistor 3322, the third terminal 3321c of the first bias transistor 3321 generates a first bias voltage $Vb_{21}$ and the third terminal 3322c of the second bias transistor 3322 generates a second bias voltage $Vb_{22}$.

In the embodiment, the column circuitry 320 includes a first transistor 321 and a second transistor 322. A first terminal 321a of the first transistor 321 is electrically coupled to any pixel column or any row of sensing pixels (not shown) of the fingerprint sensing pixel array 210. A third terminal 321c of the first transistor 321 is electrically coupled to the third terminal 3321c of the first bias transistor 3321 to receive the first bias voltage $Vb_{21}$. The second terminal 321b of the first transistor 321 is electrically coupled to a first terminal 322a of the second transistor 322. A third terminal 322c of the second transistor 322 is electrically coupled to the third terminal 3322c of the second bias transistor 3322 of the biasing circuit 332 to receive the second bias voltage $Vb_{22}$. The second terminal 322b of the second transistor 322 is electrically coupled to a second baseline voltage $VN_{22}$.

In response to the first bias voltage $Vb_{21}$ and the second bias voltage $Vb_{22}$ from the biasing circuit 332, the column output current $I_3$ flowing through any row or any pixel column of sensing pixels is equal to or close to the reference current $I_{3Ref}$.

In the above embodiment, the bias voltage is used for providing a working voltage. In the above embodiment, the column sensing line is electrically coupled to the corresponding pixel column. The column circuitry (e.g., the transistor) coupled to the pixel column receives the bias voltage from the biasing circuit. Consequently, the column output current flowing through the pixel column coincides with the reference current of the current source. It is noted that the circuitry design may be modified. For example, in another embodiment, a row sensing line is electrically coupled to the corresponding row of sensing pixels. The column circuitry (e.g., the transistor) coupled to the pixel rows receives the bias voltage from the biasing circuit. Consequently, the row output current flowing through the pixel rows coincides with the reference current of the current source.

From the above descriptions, the present invention provides a fingerprint sensing module. A current mirror circuit of the fingerprint sensing module is defined by the current source, the biasing circuit and the column circuitries collaboratively. Due to the characteristics of the current mirror circuit, each of the column output currents or the row output currents provided by the column circuitries is equal to the reference current. That is, the column output current or the row output current coincides with the reference current. Consequently, the column output current or the row output current is not adversely affected by the external factors.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A fingerprint sensing module, comprising:
  a fingerprint sensing pixel array for sensing a fingerprint signal, wherein the fingerprint sensing pixel array comprises a plurality of sensing pixels in an array arrangement;
  a plurality of column circuitries, wherein each column circuitry is electrically coupled to a row of the sensing pixels via a corresponding row signal line; and
  a constant current circuit for generating a bias voltage to the column circuitries according to a reference current,
  wherein, in response to the bias voltage level, a row output current provided by each column circuitry and flowing through each row of the sensing pixels is equal to or close to the reference current.

2. The fingerprint sensing module as claimed in claim 1, wherein the constant current circuit is a differential amplifier or a current mirror circuit, and the constant current circuit provides the bias voltage to a transistor of each column circuitry.

3. The fingerprint sensing module as claimed in claim 2, wherein the current mirror circuit has a basic current mirror configuration, a cascode current mirror configuration, a Wilson current mirror configuration or a Widlar current mirror configuration.

4. The fingerprint sensing module as claimed in claim 1, wherein the constant current circuit comprises: a current source providing the reference current; and; a biasing circuit, wherein a first terminal of the biasing circuit is electrically coupled to the current source to receive the reference current, a second terminal of the biasing circuit is electrically coupled to a baseline voltage, and a third terminal of the biasing circuit is electrically coupled to the first terminal of the biasing circuit, and wherein the bias voltage is generated on the third terminal in response to the reference current.

5. The fingerprint sensing module as claimed in claim 4, wherein the biasing circuit comprises a bias transistor, the first terminal is a drain terminal of the bias transistor, the second terminal is a source terminal of the bias transistor, and the third terminal is a gate terminal of the bias transistor.

6. The fingerprint sensing module as claimed in claim 1, wherein the constant current circuit comprises:
  a current source providing the reference current; and
  a biasing circuit comprising a first bias transistor and a second bias transistor, wherein a first terminal of the first bias transistor is electrically coupled to the current source and a third terminal of the first bias transistor, a second terminal of the first bias transistor is electrically coupled to a first terminal and a third terminal of the second bias transistor, and a second terminal of the second bias transistor is electrically coupled to a baseline voltage,
  wherein the bias voltage is generated on the third terminal of the first bias transistor and the third terminal of the second bias transistor, and provided to the column circuitry in response to the reference current.

7. The fingerprint sensing module as claimed in claim 6, wherein each of the column circuitries comprises a first transistor and a second transistor, wherein a first terminal of the first transistor is electrically coupled to the row signal line, a second terminal of the first transistor is electrically coupled to a first terminal of the second transistor, a third terminal of the first transistor is electrically coupled to the third terminal of the first bias transistor, a second terminal of the second transistor is electrically coupled to another baseline voltage, and a third terminal of the second transistor is electrically coupled to the third terminal of the second bias transistor.

8. A fingerprint sensing module, comprising:
a fingerprint sensing pixel array for sensing a fingerprint signal, wherein the fingerprint sensing pixel array comprises a plurality of sensing pixels in an array arrangement;
a plurality of column circuitries, wherein each column circuitry is electrically coupled to a column of the sensing pixels via a corresponding column signal line;
a current source providing a reference current; and
a biasing circuit, wherein a first terminal of the biasing circuit is electrically coupled to the current source to receive the reference current, a second terminal of the biasing circuit is electrically coupled to a baseline voltage, and a third terminal of the biasing circuit is electrically coupled to the column circuitries,
wherein the bias voltage is generated on the third terminal of the biasing circuit in response to the reference current, wherein in response to the bias voltage, a row output current is provided by each column circuitry, and the row output current is equal to or close to the reference current.

9. The fingerprint sensing module as claimed in claim 8, wherein the sensing pixel in each pixel column comprises a pixel transistor, and each column circuitry comprises a constant current transistor, wherein a drain terminal of the constant current transistor is electrically coupled to a drain terminal of the pixel transistor.

10. The fingerprint sensing module as claimed in claim 9, wherein the current source is electrically coupled to the first terminal and the third terminal of the biasing circuit, and the pixel transistor and a gate terminal of the constant current transistor are electrically coupled to the third terminal of the biasing circuit, so that a current mirror circuit is defined by the current source, the biasing circuit and the column circuitries collaboratively.

11. The fingerprint sensing module as claimed in claim 10, wherein the biasing circuit comprises a bias transistor, wherein the first terminal is a drain terminal of the bias transistor, the second terminal is a source terminal of the bias transistor, and the third terminal is a gate terminal of the bias transistor.

* * * * *